United States Patent [19]

Yoshida et al.

[11] Patent Number: 5,373,740
[45] Date of Patent: Dec. 20, 1994

[54] ACCELERATION SENSOR FOR SENSING SPEED THROUGH MOVEMENT OF MAGNETICA POLES

[75] Inventors: Ryouichi Yoshida; Kiyotaka Miyauchi, both of Shiga, Japan

[73] Assignee: Takata Corporation, Tokyo, Japan

[21] Appl. No.: 25,920

[22] Filed: Mar. 3, 1993

[30] Foreign Application Priority Data

Mar. 10, 1992 [JP] Japan .................................. 4-051624

[51] Int. Cl.⁵ ............................................. G01P 15/08
[52] U.S. Cl. ................................... 73/517 R; 324/162
[58] Field of Search ................. 73/517 R; 324/207.21, 324/162, 165

[56] References Cited

U.S. PATENT DOCUMENTS

| | | | |
|---|---|---|---|
| 3,483,759 | 12/1969 | Venetos et al. | 73/517 R |
| 3,867,844 | 2/1975 | Shimizu et al. | 73/517 R |
| 4,403,515 | 7/1983 | Iwasaki | 73/517 R |
| 4,922,753 | 5/1990 | Idogaki et al. | 73/517 R |
| 4,967,598 | 11/1990 | Wakatsuki et al. | 73/517 R |
| 5,027,657 | 7/1991 | Juckenack et al. | 73/517 R |

Primary Examiner—Richard E. Chilcot, Jr.
Assistant Examiner—Joseph L. Felber
Attorney, Agent, or Firm—Kanesaka & Takeuchi

[57] ABSTRACT

An acceleration sensor is formed of a magnet having a magnetizing pattern in which N and S poles are alternately arrayed in one direction, a housing for slidingly holding the magnet in one direction, and a magneto-electric converting element provided within the housing facing the magnet. The acceleration sensor detects a change in speed applied to the acceleration sensor from the output of the magneto-electric converting element.

6 Claims, 6 Drawing Sheets

TO DETECTING CIRCUIT

ACCELERATION SENSOR FOR SENSING SPEED THROUGH MOVEMENT OF MAGNETICA POLES

FIELD OF THE INVENTION

The present invention relates to an acceleration sensor and more particularly, to an acceleration sensor suitable for detecting a large change in the speed of a vehicle caused by a collision and the like.

DESCRIPTION OF THE RELATED ART

An acceleration sensor of this kind is described in U.S. Pat. No. 4,827,091. This known sensor comprises a cylinder made of a conductive material, a magnetized inertial member mounted in the cylinder so as to be movable longitudinally of the cylinder, a conductive member mounted at least on an end surface of the inertial member which is on a side of one longitudinal end of the cylinder, a pair of electrodes disposed at the one longitudinal end of the cylinder, an attracting member disposed near the other longitudinal end of the cylinder, and a coil for operation test of the magnetized inertial member wound around the cylinder. When the conductive member of the magnetized inertial member makes contact with the electrodes, these electrodes are caused to conduct via the conductive member. The attracting member is made of such a magnetic material that the attracting member and the inertial member are magnetically attracted towards each other.

In this acceleration sensor, the magnetized inertial member and the attracting member attract each other. When no or almost no acceleration is applied to the sensor, the inertial member is at rest at the other end in the cylinder.

If a relatively large acceleration acts on this acceleration sensor, the magnetized inertial member moves against the attracting force of the attracting member. During the movement of the inertial member, an electrical current is induced in this cylinder, producing a magnetic force which biases the inertial member in the direction opposite to the direction of movement of the inertial member. Therefore, the magnetized inertial member is braked, so that the speed of the movement is reduced.

When the acceleration is less than a predetermined magnitude, or threshold value, the magnetized inertial member comes to a stop before it reaches the front end of the cylinder. Then, the inertial member is pulled back by the attracting force of the attracting member.

When the acceleration is greater than the predetermined magnitude, or the threshold value, e.g., the vehicle carrying this acceleration sensor collides with an object, the inertial member arrives at the one end or front end of the cylinder. At this time, the conductive layer on the front end surface of the inertial member makes contact with both electrodes to electrically connect them with each other. If a voltage has been previously applied between the electrodes, an electrical current flows when a short circuit occurs between them. This electrical current permits detection of collision of the vehicle.

By the way, the magnetized inertial member may be moved to the front end of the cylinder to abut against the electrodes by applying current to the testing coil. Thus the use of the testing coil allows checking the operation of the magnetized inertial member.

However, since the conventional acceleration sensor described above detects that when an acceleration greater than a predetermined value has been applied, the magnetized inertial member makes contact with the electrodes, it cannot detect the acceleration if the contact between the magnetized inertial member and the electrodes fails to conduct due to rust and the like. Therefore, it is less reliable.

Further, although the aforementioned conventional acceleration sensor can detect a large change in speed such that the magnetized inertial member abuts against the electrodes, it cannot detect the change in speed quantitatively.

SUMMARY OF THE INVENTION

Accordingly, it is an object of the present invention to provide a highly reliable acceleration sensor.

It is another object of the present invention to provide an acceleration sensor which allows to detect a change in speed quantitatively.

In accordance with a first aspect of the invention, there is provided an acceleration sensor comprising: a magnet having a magnetizing pattern in which N and S poles are alternately arrayed in one direction; a housing for slidingly holding the magnet in such one direction; and a magneto-electric converting element provided within the housing facing the magnet; the acceleration sensor being adapted to detect a change in speed applied to the acceleration sensor from the output of the magneto-electric converting element.

In accordance with a second aspect of the invention, there is provided the acceleration sensor of the first aspect, wherein a biasing means for biasing the magnet always in one direction is provided.

In accordance with a third aspect of the invention, there is provided the acceleration sensor of the first aspect, wherein a means for converting the analog output signals of the magneto-electric converting element to digital signals and a means for finding the change in speed by counting the number of pulses of the digital signals within a reference time are provided.

In accordance with a fourth aspect of the invention, there is provided the acceleration sensor of the first aspect, wherein the magneto-electric converting element comprises a two-phase magneto-resistant sensor provided so that the phase difference becomes 90° to detect a direction of the change in speed together with a magnitude of the change in speed from outputs of each phase.

When an acceleration is applied to the acceleration sensor of the invention, the magnet moves with a speed which corresponds to the acceleration.

Since this magnet has such magnetization pattern in which N and S are alternately arrayed, pulse signals with a frequency which corresponds to the travel speed of the magnet are output from the magneto-electric converting element. Then the travel speed of the magnet may be detected from the number of pulses. The acceleration applied to the acceleration sensor may be quantitatively detected by finding the elapsed change in the travel speed of the magnet by computation and the like.

In the acceleration sensor according to the second aspect of the invention, one end of the magnet is set in a biased position in the direction of movement.

By the acceleration sensor according to the third aspect of the invention, the travel speed of the magnet may be found by converting the analog output of the magneto-electric converting element to digital output and by counting the digital pulse number within a reference time.

By the acceleration sensor according to the fourth aspect of the invention, a direction of change in speed may be found together with the change in speed from the outputs of the two-phase magneto-resistant sensor.

DETAILED DESCRIPTION OF PREFERRED EMBODIMENTS

Figure 1:
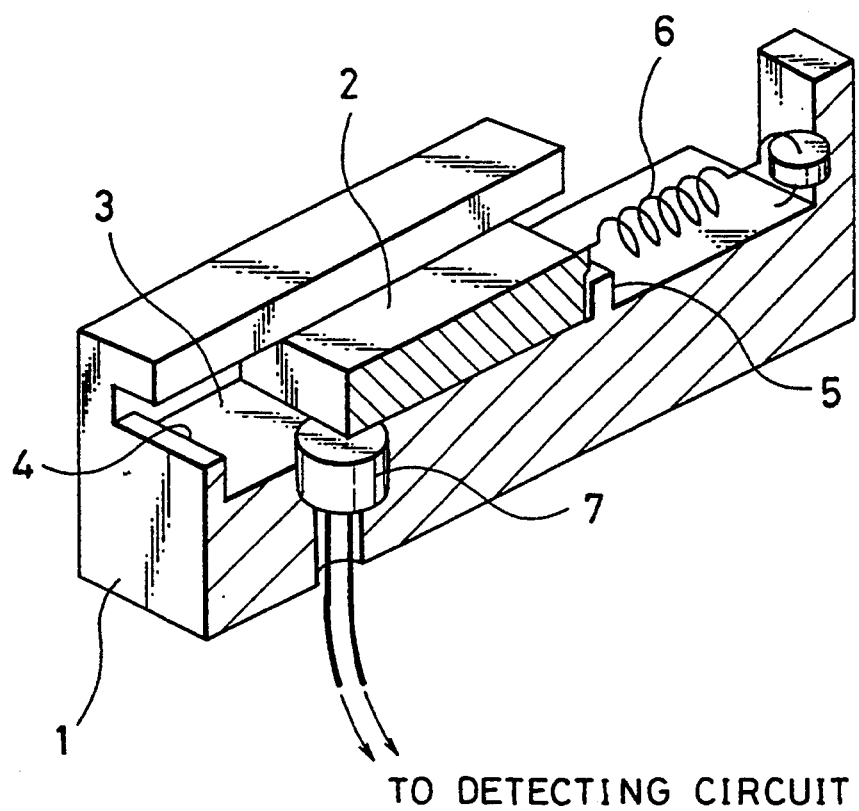
FIG. 1 is a sectional perspective view of an acceleration sensor according to an embodiment of the present invention.
Figure 2:
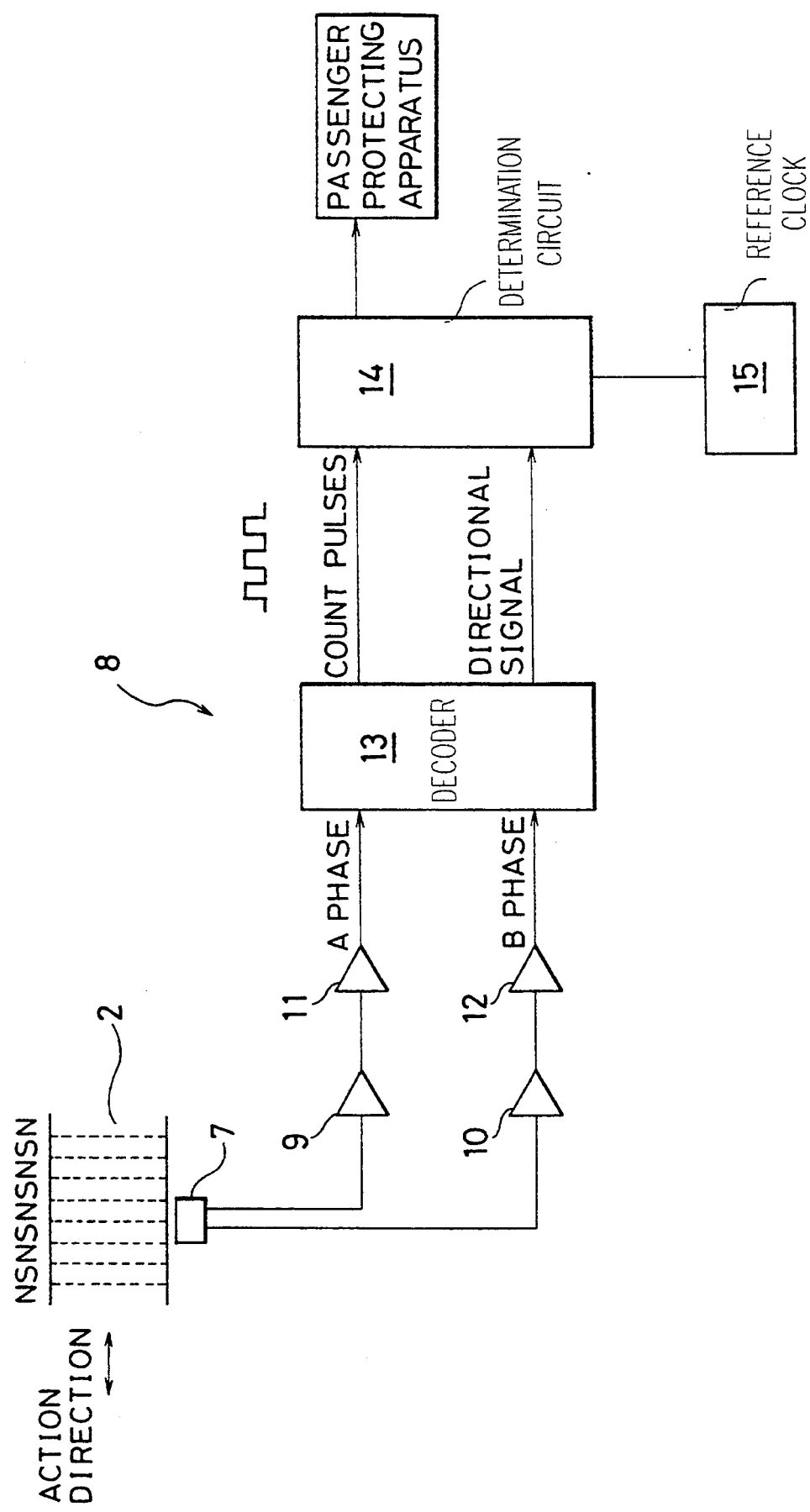
FIG. 2 is a block diagram of a change in speed detecting circuit.

Referring now to the drawings, preferred embodiments of the present invention will be explained. FIG. 1 is a perspective view of a longitudinal cross section of an acceleration sensor according to the preferred embodiment of the present invention and FIG. 2 is a block diagram of a change in speed detecting circuit.

Within a housing 1, a concave channel 3 for holding a magnet 2 is provided and stoppers 4 and 5 for defining the forward limit and back limit of the movement of the magnet 2 are provided at both ends of the concave channel 3 in which the magnet 2 is slidably inserted in the longitudinal direction of the channel 3. The magnet 2 has a magnetization pattern in which N and S are alternately arrayed as shown in FIG. 2.

A tension coil spring for biasing 6 is provided across the rear end of the housing 1 and the rear end of the magnet 2. The magnet 2 is lightly pulled by the tension coil spring 6 to set a position where it abuts against the stopper 5 as a bias position.

A magneto-resistant sensor (hereinafter referred to as MR sensor) 7 is provided in a manner facing the inside of the concave channel 3. Output of the MR sensor 7 is output to a change in speed detecting circuit 8. In the present embodiment, a two-phase MR sensor having two phases, A and B which differs by 90° is adopted as the MR sensor.

As shown in FIG. 2, the A and B phase analog outputs of the MR sensor 7 are converted to digital signals by comparators 11 and 12 after being amplified by amplifiers 9 and 10. Then the both A and B signals are processed in a decoder 13 and pulse signals which indicate a travel speed of the magnet and directional signals which indicate a travel direction of the magnet are output from the decoder 13 to a determination circuit 14. Reference clock pulse signals are being input to the determination circuit 14 from a reference clock 15 and the travel speed of the magnet may be found by counting the number of pulses from the MR sensor within the reference clock pulses. The travel acceleration of the magnet, i.e. the acceleration applied to the acceleration sensor, may be found by differentiating the travel speed of the magnet by time.

The acceleration sensor of the present embodiment may be used as a collision detecting sensor of a vehicle and when a change in speed applied to the acceleration sensor is greater than a threshold value, the determination circuit 14 outputs a command signal for actuating a passenger protecting apparatus. Although the protecting apparatus may be a pretensioner of a seat-belt unit in the present embodiment, it may be also a belt-locking apparatus of the seat-belt apparatus or an airbag unit.

A timing for actuating the pretensioner apparatus in a typical vehicle is preferred to be when the travel speed of the magnet 2 reaches to 0.7 to 0.8 m/sec. Accordingly, when the magnetization pitch of the magnet 2 is 0.1 mm, the pretensioner apparatus will be actuated when the pulse interval input to the determination circuit 14 becomes 1/7000 to 1/8000 sec. Therefore, it is desirable to structure the reference clock 15 so that it outputs 7000 to 8000 pulses/sec.

Although the MR sensor is used in the aforementioned embodiment, another magneto-electric converting element such as a Hall element may be used.

Figure 7:
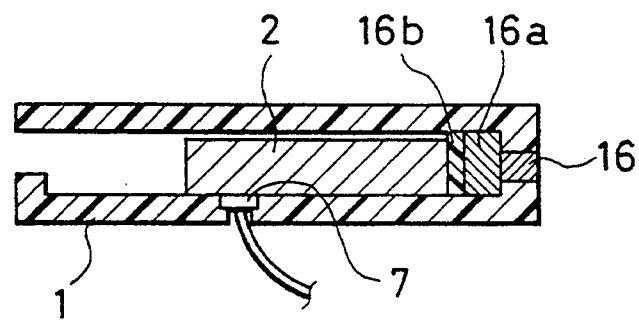
FIG. 7 is a section view of an acceleration sensor according to another embodiment.

Further, although the spring is used for biasing the magnet, a magnet 16 which attracts the magnet 2 may be used as shown in FIG. 7. The reference numeral 16a denotes an iron piece and 16b a resin spacer integral with the magnet 2.

Also, although the MR sensor is two-phase type sensor in the embodiment above, it may be one-phase type MR sensor.

As it is known, the MR sensor comprises a pair or a plurality of pairs of magneto-resistant elements whose resistance value changes in accordance with a change in magnetic field. The Hall element is a semiconductor element utilizing the generation of Hall voltage.

Next, the reason why the travel direction of the magnet may be discriminated in the acceleration sensor using the MR sensor in which A and B phases have a phase difference of 90° will be explained.

Figure 3:
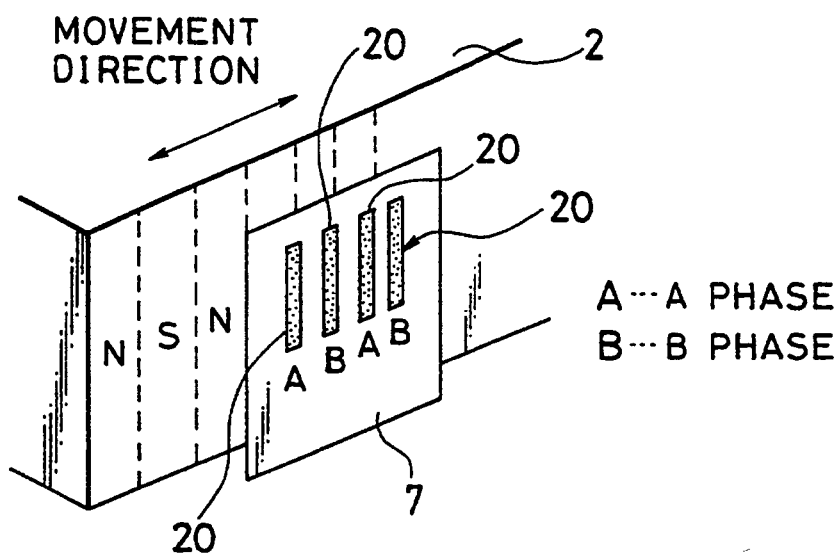
FIG. 3 is a schematic drawing showing a relationship between a magnet and a MR sensor.

As typically shown in FIG. 3, the two-phase MR sensor includes a pair of (two) MR elements 20 arranged in a pitch of ¼ of the magnetization pitch. When the magnet moves with a constant speed in the left direction relative to the MR sensor as shown in FIG. 4, outputs of the A and B phases will become as shown in the lower half of the figure.

Figure 5:
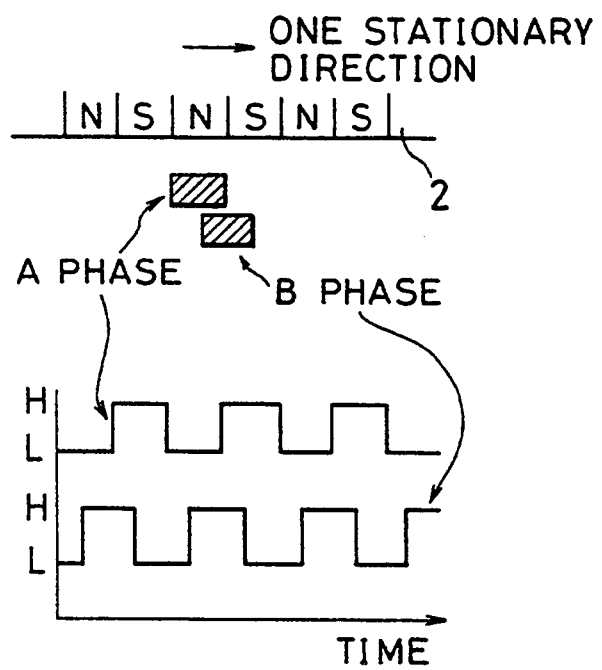
FIG. 5 is a diagram explaining an output of the MR sensor.

When the magnet moves with a constant speed in the right direction relatively to the MR sensor as shown in FIG. 5, outputs of the A and B phases will become as shown in the lower half of the figure.

Figure 6:
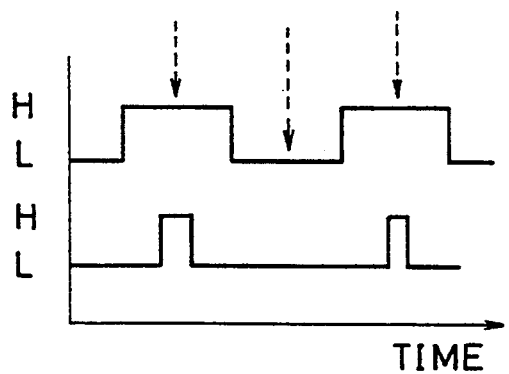
FIG. 6 is a diagram explaining an output of the MR sensor.

Further, FIG. 6 shows outputs of the A and B phases when the magnet vibrates. In FIG. 6, the travel direction of the magnet changes at the times indicated by the downward arrows.

Figure 4:
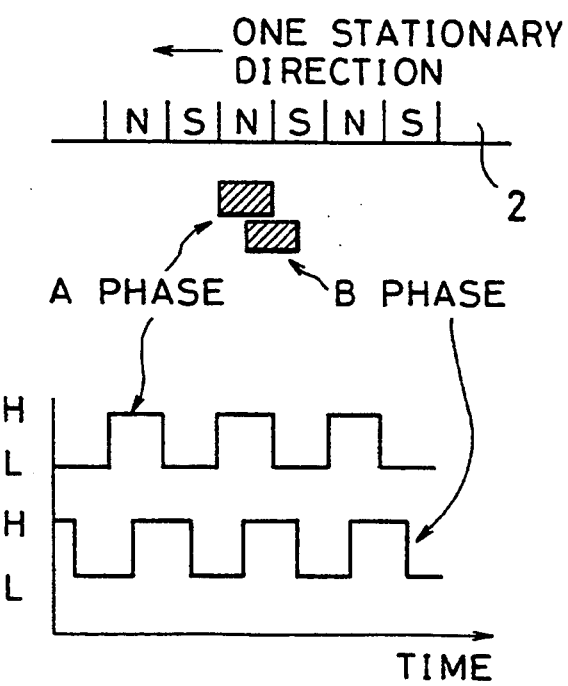
FIG. 4 is a diagram explaining an output of the MR sensor.

As seen from FIGS. 4 through 6, since the output patterns of the A and B phases differ depending on the travel directions of the magnet, it allows to detect the travel direction of the magnet. By the way, the outputs of the A and B phases are digitized in FIGS. 4 through 6.

Figure 8:
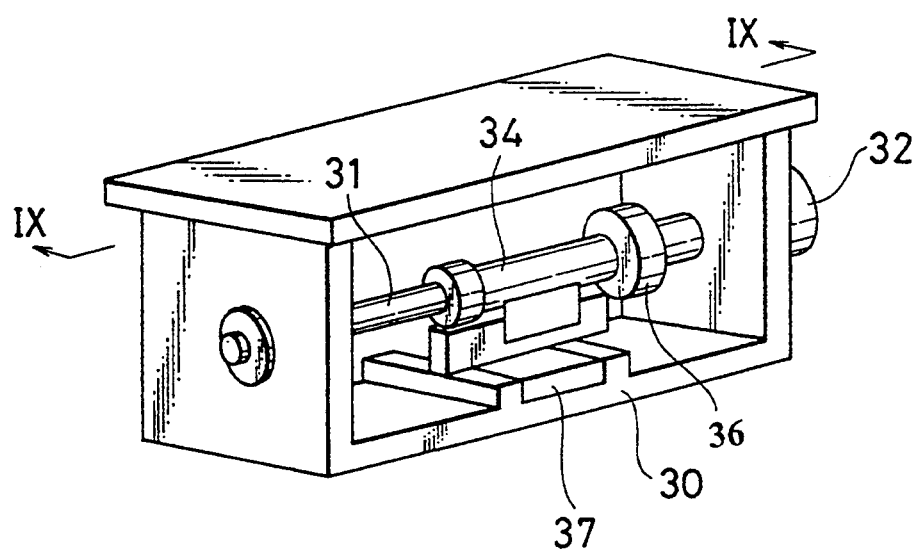
FIG. 8 is a perspective view of the acceleration sensor according to another embodiment.
Figure 9:
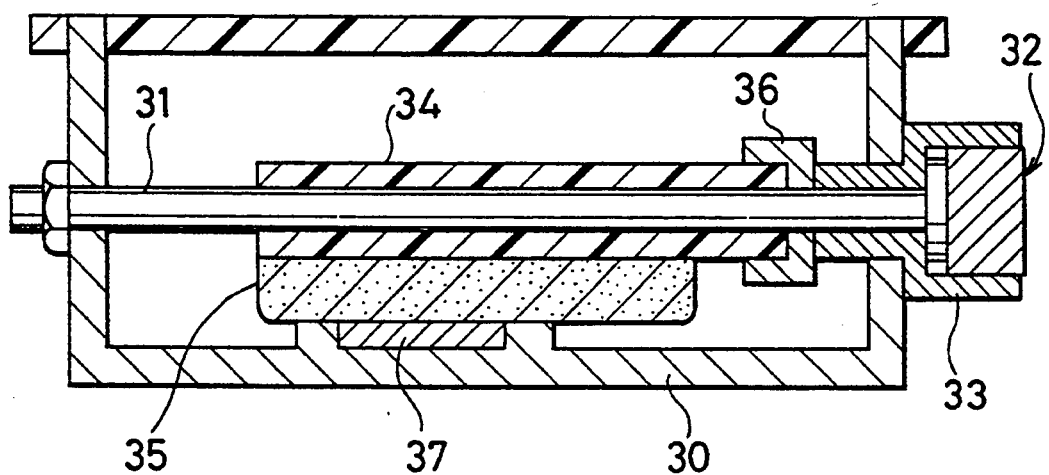
FIG. 9 is a section view taken along line IX—IX in FIG. 8.

FIG. 8 is a perspective view of an acceleration sensor according to another embodiment of the invention and FIG. 9 is a section view taken along line IX—IX in FIG. 8. A shaft 31 is provided within a block housing 30 penetrating therethrough and a magnet 32 for holding initial position is provided at one end of the shaft 31 through the intermediary of a yoke 33.

A column 34 made of a synthetic resin is slidably fitted around the shaft 31 and a magnet 35 is mounted on the lower surface side of the column 34. This magnet 35 has the magnetization pattern in which N and S are alternately arrayed in the longitudinal direction of the shaft 31. The magnet 35, column 34 and yoke 36 mounted on one end of the column 34 move forward and back as one unit along the shaft 31.

A MR element 37 is provided facing to the magnet 35. A magnitude of change in speed and a direction thereof may be found from the output of the MR element 37 in the same manner as described in relation to the aforementioned embodiment.

In the above embodiments, the travel range of the magnets 2 and 35 is limited. That is, the magnets 2 and 35 are allowed to move only between the back limit position and the forward limit position to which the magnets 2 and 35 abut in FIGS. 1 and 9. Accordingly, the output of the MR element will not exceed a threshold value unless the travel speed of the magnets 2 and 35 exceed the threshold value when the magnets move from the back limit position to the forward limit position.

As described above, the acceleration sensor of the present invention is adapted to detect the movement of the magnet by the magneto-electric converting element, so that it has electrically no contact. Accordingly, it causes no error due to a conductive failure of the contact and is highly reliable. Further, the acceleration sensor of the invention permits to measure a magnitude of change in speed quantitatively.

The acceleration sensor according to the second aspect of the invention is suitable for measuring a change in speed caused in a certain direction since a bias position is given to the magnet.

The acceleration sensor according to the third aspect of the invention permits finding the change in speed in high precision.

The acceleration sensor according to the fourth aspect of the invention permits detecting not only the magnitude of the change in speed but also the direction thereof.

What is claimed is:

1. An acceleration sensor comprising:
    a magnet having a magnetizing pattern in which North and South poles are alternately arranged in one direction;
    a housing for slidingly constraining motion of said magnet in one direction; and
    a magneto-electric converting element provided within said housing facing said magnet, said magneto-electric converting element including a two-phase magneto-resistant sensor arranged to have a phase difference to detect a direction of change in speed together with a magnitude Of the change in speed from the output of each phase;
    said acceleration sensor being adapted to detect a change in speed applied to said acceleration sensor from the output of said magneto-electric converting element.

2. The acceleration sensor of claim 1, wherein biasing means for biasing said magnet always in one direction is provided.

3. The acceleration sensor of claim 1, wherein said acceleration sensor further comprises:
    means for converting analog output signals of said magneto-electric converting element to digital signals; and
    means for finding change in speed by counting the number of pulses of said digital signals within a reference time.

4. An acceleration sensor comprising:
    a magnet device having a magnetizing pattern containing a plurality of North and South poles alternately arranged in one direction;
    a housing for slidingly constraining motion of said magnet device along said one direction; and
    a magneto-electric converting element provided in said housing to face said magnet device, said converting element detecting North and South poles of the magnet device passing over the converting element and outputting signals corresponding to the number of North and South poles so that speed of the magnet device relative to the housing is measured based on the number of North and South poles of the magnet device passing over the converting element.

5. The acceleration sensor of claim 4, further comprising biasing means situated between the magnet device and the housing, said biasing means urging the magnet device in one direction, said magnet device, when an acceleration is applied, moving in a direction opposite to a force of the biasing means.

6. The acceleration sensor of claim 5, wherein said converting element includes a reference clock, said number of North and South poles counted in the converting element being compared with the reference clock to thereby find a traveling speed of the magnet device.

* * * * *